United States Patent
Iwatsu et al.

(10) Patent No.: US 12,488,158 B2
(45) Date of Patent: Dec. 2, 2025

(54) MANUFACTURING SYSTEM DESIGN ASSISTANCE APPARATUS

(71) Applicant: Mitsubishi Electric Corporation, Tokyo (JP)

(72) Inventors: Satoshi Iwatsu, Tokyo (JP); Kohei Fujita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1077 days.

(21) Appl. No.: 17/605,580

(22) PCT Filed: Jul. 3, 2019

(86) PCT No.: PCT/JP2019/026402
§ 371 (c)(1),
(2) Date: Oct. 22, 2021

(87) PCT Pub. No.: WO2021/001949
PCT Pub. Date: Jan. 7, 2021

(65) Prior Publication Data
US 2022/0164495 A1  May 26, 2022

(51) Int. Cl.
*G06F 30/17*    (2020.01)
(52) U.S. Cl.
CPC ................... *G06F 30/17* (2020.01)
(58) Field of Classification Search
CPC .......... G06F 30/00; G06F 30/17; Y02P 90/30; G06Q 10/063; G06Q 50/04
USPC ............................................................ 703/1
See application file for complete search history.

(56) References Cited

U.S. PATENT DOCUMENTS

| 5,191,534 A | 3/1993 | Orr et al. |
| 2006/0155407 A1 | 7/2006 | Azuma |
| 2014/0278275 A1* | 9/2014 | Han ................. G06F 30/00 703/1 |

(Continued)

FOREIGN PATENT DOCUMENTS

| JP | 5-101072 A | 4/1993 |
| JP | 2003-44115 A | 2/2003 |
| JP | 2006-190159 A | 7/2006 |

OTHER PUBLICATIONS

International Search Report and Written Opinion mailed on Sep. 3, 2019, received for PCT Application PCT/JP2019/026402, Filed on Jul. 3, 2019, 7 pages including English Translation.

*Primary Examiner* — Cedric Johnson
(74) *Attorney, Agent, or Firm* — XSENSUS LLP

(57) ABSTRACT

A plurality of pieces of design information created in the respective design processes and dependencies among the plurality of pieces of design information are stored. A piece of design information to be changed by a piece of design information that is input is extracted from the plurality of pieces of design information. The piece of design information is combined with the plurality of pieces of design information. An influence of the piece of design information on one or more pieces of design information other than the piece of design information to be changed is analyzed based on the dependencies, and it is determined whether the piece of design information is required to be changed. The design process is notified of a request for change of the piece of design information when it is determined that the piece of design information is required to be changed.

13 Claims, 10 Drawing Sheets

(56) References Cited

U.S. PATENT DOCUMENTS

2015/0324489 A1\* 11/2015 Onodera ................ G06F 30/17
   703/1

\* cited by examiner

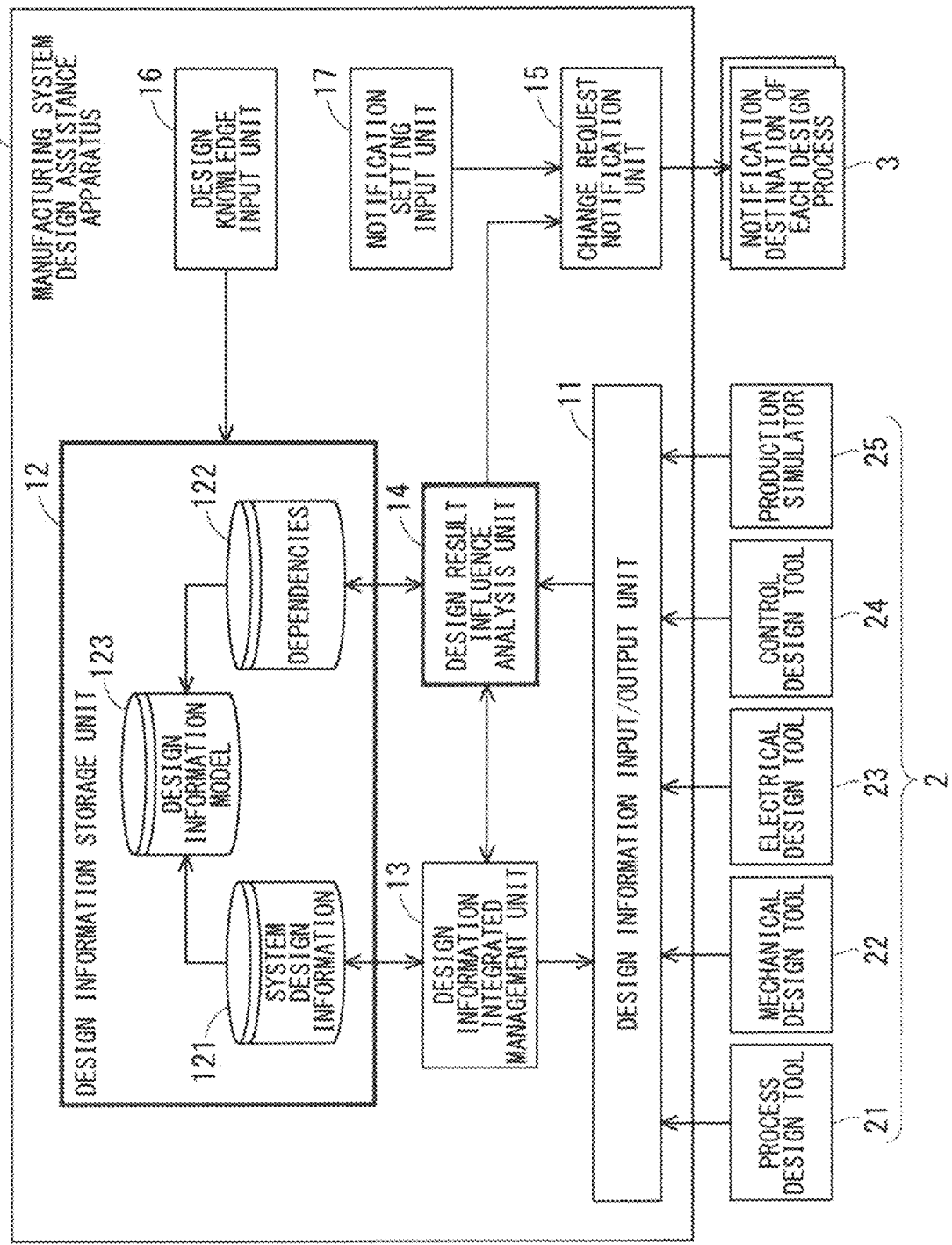
F I G. 1

FIG. 3

DETAILS OF KNOWLEDGE OF DEPENDENCIES AMONG PIECES OF DESIGN INFORMATION ~162

TYPE OF RULE
[INEQUALITY OF DESIGN ITEM ∨] ~162a
[< □ >]
PRESENCE OR ABSENCE OF ANY DESIGN ITEM
INEQUALITY BETWEEN DESIGN VALUES
ANOTHER RELATIONAL EXPRESSION BETWEEN DESIGN VALUES

DETAILS OF RULE
DETAILS OF INEQUALITY BETWEEN DESIGN VALUES:
[APPARATUS. OUTER DIMENSION. x ∨] [IS SMALLER THAN ∨] [∨]
[< □ >]
PROCESS. INSTALLATION SPACE. x
PROCESS. INSTALLATION SPACE. y
PROCESS. INSTALLATION SPACE. z
APPARATUS. DISTANCE BETWEEN CONTACT POINTS

[OK] [CANCEL] ~162c 162d  162f  162e

162b

MANUFACTURING SYSTEM DESIGN ASSISTANCE APPARATUS

CROSS-REFERENCE TO RELATED APPLICATION

The present application is based on PCT filing PCT/JP2019/026402, filed Jul. 3, 2019, the entire contents of which are incorporated herein by reference.

TECHNICAL FIELD

The present invention relates to manufacturing system design assistance apparatuses.

BACKGROUND ART

The design and manufacture of a product cannot be independent of each other. A design department to design the product and a manufacturing department to manufacture the product are thus desired to cooperate with each other when the design department changes a design of the product.

In technology disclosed in Patent Document 1, design verification information is managed. Arrangement information including an order instruction and a manufacture instruction is set for the managed design verification information. A possible range and a prohibited range of a design change are designated based on the set arrangement information. Based on the designated possible range and prohibited range, the possible range and the prohibited range of the design change are displayed on a drawing of a part whose design is to be changed on a design terminal apparatus side.

In technology disclosed in Patent Document 2, an affected items table and a location affected items table are stored. The affected items table includes objects to which all the design changes relate. A "status" column of a location affected item indicates a status of the location affected item at any time in a particular plant. A "planned disposition" column of the location affected item indicates action to be taken on existing stocks of an affected part in manufacturing plants as a result of introduction of an engineering change. Windows are provided so that a design engineer and a manufacturing engineer can promote states of an affected item and the location affected item, respectively.

According to technology represented by the technology disclosed in Patent Documents 1 and 2, the design department to design the product and the manufacturing department to manufacture the product can cooperate with each other when the product is manufactured by a fixed manufacturing system.

A manufacturing system to manufacture a product has been complicated in recent years. A plurality of design processes are thus responsible for designing the manufacturing system in many cases. When the plurality of design processes are responsible for designing the manufacturing system, a plurality of designs performed by respective design departments are desired to be centrally managed.

In technology disclosed in Patent Document 3, pieces of information handled in a process design, a layout design, and a production capacity design are consolidated in a manufacturing line design method. A manufacturing line with high productivity can thereby be designed in a short time period.

PRIOR ART DOCUMENTS

Patent Documents

Patent Document 1: Japanese Patent Application Laid-Open No. 2006-190159

Patent Document 2: Japanese Patent Application Laid-Open No. H5-101072

Patent Document 3: Japanese Patent Application Laid-Open No. 2003-44115

SUMMARY

Problem to be Solved by the Invention

A plurality of designs performed in respective design processes responsible for designing the manufacturing system cannot be independent of one another. Adjustment is thus made among the design processes to establish the design of the manufacturing system. For example, when a mechanism design relating to a mechanism of manufacturing facilities constituting the manufacturing system, an electrical design relating to electrical wiring of the manufacturing facilities, and a control design relating to operational logic of the manufacturing facilities are combined with one another, adjustment is made among design processes to perform the mechanism design, the electrical design, and the control design to establish the design of the manufacturing system. That is to say, a range of the influence of a design performed in a first design process included in the mechanism design, the electrical design, and the control design on a design performed in a second design process included in the mechanism design, the electrical design, and the control design is examined by a designer of the second design process to check whether there is any problem, and, if there is any problem, a designer of the first design process is notified that there is any problem. Such adjustment, however, requires rework in design of the manufacturing system to thereby cause a delay in design of the manufacturing system.

The present invention has been conceived in view of the problem. It is an object of the present invention to provide a manufacturing system design assistance apparatus capable of suppressing rework in design required by adjustment between a design process in which a piece of design information is created and other design processes in which other pieces of design information are created.

Means to Solve the Problem

A manufacturing system design assistance apparatus includes: a design information input unit, a design information storage unit, a design information integrated management unit, a design result influence analysis unit, and a change request notification unit.

A piece of design information created in a design process included in a plurality of design processes responsible for designing a manufacturing system is input into the design information input unit.

The design information storage unit stores a plurality of pieces of design information created in the respective design processes and dependencies among the plurality of pieces of design information.

The design information integrated management unit extracts, from the plurality of pieces of design information, a piece of design information to be changed that is changed by the piece of design information, and combines the piece of design information with the plurality of pieces of design information.

The design result influence analysis unit analyzes, based on the dependencies, an influence of the piece of design information on one or more pieces of design information other than the piece of design information to be changed included in the plurality of pieces of design information, and determines whether the piece of design information is required to be changed.

The change request notification unit notifies the design process of a request for change of the piece of design information when it is determined that the piece of design information is required to be changed.

Effects of the Invention

According to the present invention, the design process in which the piece of design information is created is notified of the request for change of the piece of design information when it is determined that the piece of design information is required to be changed. The design process in which the piece of design information is created can thus easily recognize the need to change the piece of created design information. Rework in design required by adjustment between the design process in which the piece of design information is created and the other design processes in which the other pieces of design information are created can thereby be suppressed.

The objects, features, aspects, and advantages of the present invention will become more apparent from the following detailed description and the accompanying drawings.

BRIEF DESCRIPTION OF DRAWINGS

FIG. 1 is a block diagram schematically showing a manufacturing system design assistance apparatus in Embodiment 1.

FIG. 3 shows an example of the user interface screen displayed by the manufacturing system design assistance apparatus in Embodiment 1, and used for input of knowledge relating to the dependencies.

DESCRIPTION OF EMBODIMENTS

1 Embodiment 1

1.1 Manufacturing System Design Assistance Apparatus

Figure 2:
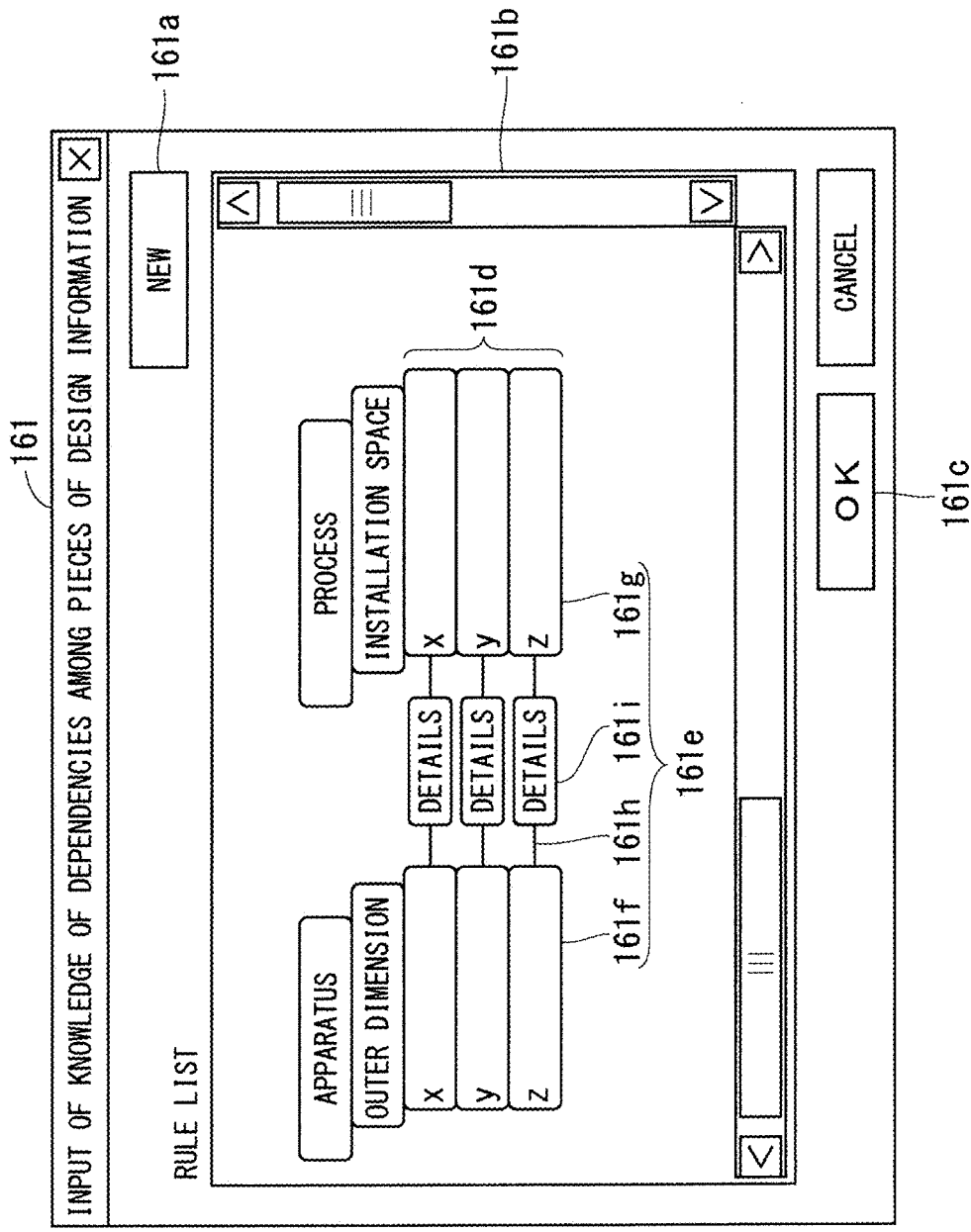
FIG. 2 shows an example of a user interface screen displayed by the manufacturing system design assistance apparatus in Embodiment 1, and used for input of knowledge relating to dependencies.

FIG. 1 is a block diagram schematically showing a manufacturing system design assistance apparatus in Embodiment 1.

A manufacturing system design assistance apparatus 1 in Embodiment 1 shown in FIG. 1 assists in design of a manufacturing system to manufacture a product.

The manufacturing system design assistance apparatus 1 centrally manages a plurality of pieces of design information created in a plurality of design processes responsible for designing the manufacturing system. Each of the plurality of pieces of design information indicates a result of a design performed in a design process in which the piece of design information is created. The plurality of pieces of centrally managed design information indicate a result of a design of the manufacturing system as a whole. The manufacturing system design assistance apparatus 1 also analyzes the influence of a piece of input design information on the plurality of pieces of centrally managed design information, and determines whether the piece of input design information is required to be changed. When determining that the piece of input design information is required to be changed, the manufacturing system design assistance apparatus 1 notifies a design process in which the piece of input design information is created of a request for change of the piece of input design information. The manufacturing system design assistance apparatus 1 thereby assists in adjustment among two or more design processes of the plurality of design processes, and streamlines a system design satisfying constraints imposed on the plurality of pieces of design information.

A plurality of design tools 2 are included in the respective design processes. In each of the design processes, a design is performed using a design tool included in the design process.

The plurality of design processes include at least one design process selected from the group consisting of a process design, a mechanical design, an electrical design, a control design, and design verification. The plurality of design tools 2 thus include at least one design tool selected from the group consisting of a process design tool 21, a mechanical design tool 22, an electrical design tool 23, a control design tool 24, and a production simulator 25. In Embodiment 1, the plurality of design processes include the process design, the mechanical design, the electrical design, the control design, and the design verification. The plurality of design tools 2 include the process design tool 21, the mechanical design tool 22, the electrical design tool 23, the control design tool 24, and the production simulator 25. Designs are performed in the process design, the mechanical design, the electrical design, the control design, and the design verification using the process design tool 21, the mechanical design tool 22, the electrical design tool 23, the control design tool 24, and the production simulator 25, respectively.

The manufacturing system design assistance apparatus 1 includes a design information input/output unit 11, a design information storage unit 12, a design information integrated management unit 13, a design result influence analysis unit 14, a change request notification unit 15, a design knowledge input unit 16, and a notification setting input unit 17.

These components are configured by causing a computer to execute an application program installed on the computer. All or some of these components may be configured by hardware not executing the program. Logic to perform procedures shown in FIGS. 5 and 6, which will be described below, has been implemented in the installed application program.

A piece of design information is input into the design information input/output unit 11 from a design tool included in the plurality of design tools 2. The design information input/output unit 11 thereby functions as a design information input unit into which a piece of design information created in a design process included in the plurality of design processes is input. The design information input/output unit 11 also outputs a piece of design information to a design tool included in the plurality of design tools 2.

The design information storage unit 12 stores a piece of system design information 121 and dependencies 122.

The piece of system design information 121 indicates a result of a design of the manufacturing system as a whole, and includes the plurality of pieces of design information created in the respective design processes responsible for designing the manufacturing system.

The dependencies 122 are dependencies among the plurality of pieces of design information included in the piece of system design information 121.

The design information integrated management unit 13 extracts, from the plurality of pieces of design information included in the piece of system design information 121, a piece of design information to be changed that is changed by the piece of input design information. The design information integrated management unit 13 also combines the piece of input design information with the plurality of pieces of design information included in the piece of system design information 121. The design information integrated management unit 13 combines the piece of input design information with the plurality of pieces of design information included in the piece of system design information 121 when it is determined that the piece of input design information is not required to be changed. Other pieces of design information are one or more pieces of design information other than the piece of design information to be changed included in the plurality of pieces of design information included in the piece of system design information 121.

The design result influence analysis unit 14 analyzes, based on the dependencies 122, the influence of the piece of input design information on the other pieces of design information, and determines whether the piece of input design information is required to be changed.

The change request notification unit 15 notifies the design process in which the piece of input design information is created of a request for change of the piece of input design information when it is determined that the piece of input design information is required to be changed.

According to the invention in Embodiment 1, when it is determined that the piece of input design information is required to be changed, the design process in which the piece of input design information is created is notified of the request for change of the piece of input design information. The design process in which the piece of input design information is created can thus easily recognize the need to change the piece of created design information. Rework in design required by adjustment between the design process in which the piece of input design information is created and the other design processes in which the other pieces of design information are created can thereby be suppressed.

The piece of design information is changed in the design process notified of the request for change of the piece of design information, and the piece of changed design information is input into the design information input/output unit 11. When it is determined that the piece of changed design information is required to be changed, the design process is notified of a request for change of the piece of changed design information. Change of the piece of design information and input of the piece of changed design information into the design information input/output unit 11 are repeated in the design process until the design process is not notified of the request for change of the piece of design information. A piece of design information not required to be changed can thereby be finally input into the design information input/output unit 11. The piece of design information not required to be changed is combined by the design information integrated management unit 13 with the plurality of pieces of design information included in the piece of system design information 121.

1.2 Dependencies and Request for Change of Piece of Design Information

The dependencies 122 are represented by a plurality of constraints imposed on the plurality of pieces of design information included in the piece of system design information 121.

The request for change of the piece of design information includes a violated constraint list on which one or more constraints violated by the piece of design information appear. When there is no constraint violated by the piece of design information, the design process in which the piece of design information is created is notified of an empty violated constraint list.

1.3 Data Structure

The design information storage unit 12 has a design information model 123.

The design information model 123 maintains instances of the plurality of pieces of design information. The instances of the plurality of pieces of design information are represented by a class in the form of a Unified Modeling Language (UML) class diagram, for example. The instances of the plurality of pieces of design information are maintained in a structured data format complying with AutomationML®, for example.

The plurality of pieces of design information are centrally structured, and have a particular data structure defined by the design information model 123. The particular data structure is a data structure complying with AutomationML®, for example.

The dependencies 122 are structured, and have a particular data structure defined by the design information model 123. The particular data structure is a data structure complying with AutomationML®, for example.

The design information input/output unit 11 converts the piece of input design information into a piece of structured design information having the particular data structure defined by the design information model 123.

The design information integrated management unit 13 extracts the piece of design information to be changed based on the piece of system design information 121 and the piece of structured design information. The design information integrated management unit 13 also combines the piece of structured design information with the plurality of pieces of centrally structured design information included in the piece of system design information 121.

The pieces of design information structured and represented in a standard format are thereby processed by a main part of the manufacturing system design assistance apparatus 1. This facilitates central management of the plurality of pieces of design information.

1.4 Input of Design Knowledge

Knowledge relating to the dependencies 122 is input into the design knowledge input unit 16.

When knowledge relating to the dependencies 122 is input into the design knowledge input unit 16, a combination of pieces of design information having a dependency is selected from the plurality of pieces of design information included in the piece of system design information 121, and the dependency of the selected combination of the pieces of design information is input. The pieces of design information to be combined are two pieces of design information. The pieces of design information to be combined may be three or more pieces of design information.

FIGS. 2 and 3 show examples of a user interface screen displayed by the manufacturing system design assistance apparatus in Embodiment 1, and used for input of knowledge relating to the dependencies.

User interface screens 161 and 162 respectively shown in FIGS. 2 and 3 are displayed by the computer executing the application program.

The user interface screen 161 includes a NEW button 161a, a rule list display region 161b, and an OK button 161c.

A plurality of rule rendering elements 161d are displayed in the rule list display region 161b. Rule rendering elements 161e included in the plurality of rule rendering elements 161d each indicate a dependency.

Each of the rule rendering elements 161e includes a first design information rendering element 161f, a second design information rendering element 161g, a connection line 161h, and a DETAILS button 161i. The first design information rendering element 161f and the second design information rendering element 161g are connected to each other by the connection line 161h. The DETAILS button 161i is disposed on the connection line 161h. The first design information rendering element 161f indicates a piece of first design information. The second design information rendering element 161g indicates a piece of second design information. Connecting the first design information rendering element 161f and the second design information rendering element 161g to each other using the connection line 161h indicates that the piece of first design information and the piece of second design information have a dependency.

The user interface screen 162 includes a drop-down list 162a for selecting a type of a rule, a drop-down list group 162b for selecting details of the rule, and an OK button 162c.

The drop-down list group 162b includes a drop-down list 162d for selecting the piece of first design information, a drop-down list 162e for selecting the piece of second design information, and a drop-down list 162f for selecting a condition.

When a press operation is performed on the NEW button 161a with the user interface screen 161 being displayed, the user interface screen 162 is displayed, and a new rule can be created by performing an operation on the user interface screen 162.

When a press operation is performed on the DETAILS button 161i with the user interface screen 161 being displayed, the user interface screen 162 is displayed, and an existing rule can be edited by performing an operation on the user interface screen 162.

When a press operation is performed on the OK button 161c with the user interface screen 161 being displayed, a plurality of dependencies indicated by the plurality of rule rendering elements 161d displayed in the rule list display region 161b are input into the design knowledge input unit 16.

When a selection operation to select the type of the rule is performed on the drop-down list 162a, a selection operation to select the piece of first design information is performed on the drop-down list 162d, a selection operation to select the piece of second design information is performed on the drop-down list 162e, a selection operation to select the condition is performed on the drop-down list 162f, and then a press operation is performed on the OK button 162c with the user interface screen 162 being displayed, the user interface screen 161 is displayed. In the displayed user interface screen 161, a rule rendering element indicating a rule according to the selected type of the rule, piece of first design information, piece of second design information, and condition is displayed in the rule list display region 161b.

All or some of the NEW button 161a, the OK button 161c, the DETAILS button 161i, and the OK button 162c may be replaced with graphical user interface (GUI) parts other than buttons. All or some of the drop-down lists 162a, 162d, 162e, and 162f may be replaced with GUI parts other than drop-down lists.

1.5 Input of Notification Settings

A plurality of notification settings set for the respective design processes are input into the notification setting input unit 17.

The change request notification unit 15 notifies the design process in which the piece of design information is created of the request for change of the piece of design information in accordance with a notification setting set for the design process in which the piece of design information is created. When a notification destination 3 of the design process in which the piece of design information is created is set in the notification setting, the set notification destination 3 is notified of the request for change of the piece of design information.

Figure 4:
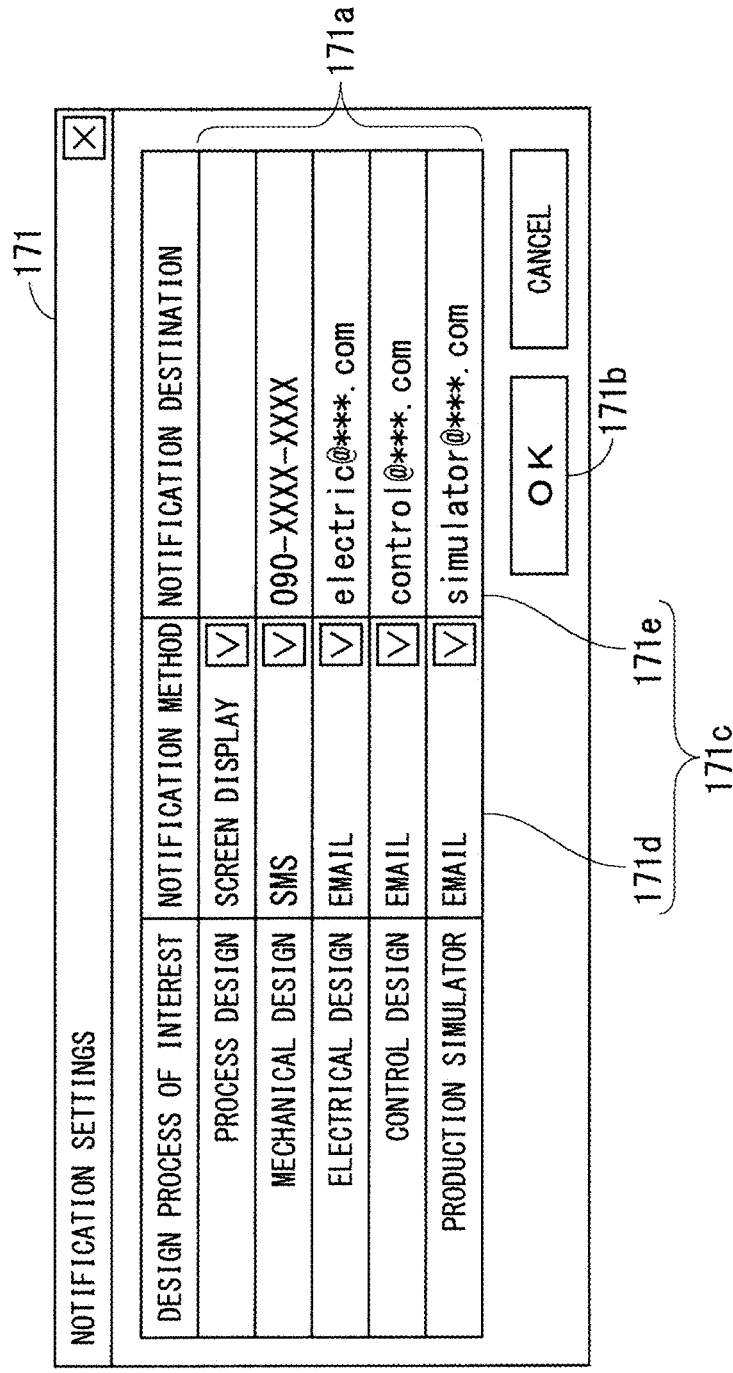
FIG. 4 shows an example of a user interface screen displayed by the manufacturing system design assistance apparatus in Embodiment 1, and used for input of a plurality of notification settings.

FIG. 4 shows an example of a user interface screen used for input of the notification settings in the manufacturing system design assistance apparatus in Embodiment 1.

A user interface screen 171 shown in FIG. 4 is displayed by the computer executing the application program.

The user interface screen 171 includes a plurality of setting rows 171a in which the respective notification settings are set and an OK button 171b.

Setting rows 171c included in the plurality of setting rows 171a each include a drop-down list 171d for selecting a notification method and a text box 171e for inputting the notification destination. A selection operation to select one notification method from screen display, a short message service (SMS), and an email can be performed on the drop-down list 171d. When a selection operation to select the screen display is performed on the drop-down list 171d, the text box 171e for inputting the notification destination is grayed out. When a selection operation to select the SMS is performed on the drop-down list 171d, an input operation to input a phone number of a mobile phone can be performed on the text box 171e. When a selection operation to select the email is performed on the drop-down list 171*d*, an input operation to input an email address can be performed on the text box 171*e*.

When a press operation is performed on the OK button 171*b* with the user interface screen 171 being displayed, the plurality of notification settings set in the respective setting rows 171*a* are input into the notification setting input unit 17.

When the selection operation to select the screen display is performed on the drop-down list 171*d*, the request for change of the piece of design information is displayed on a screen displayed by the manufacturing system design assistance apparatus 1. When the selection operation to select the SMS is performed on the drop-down list 171*d*, a short message in which the request for change of the piece of design information is described is transmitted to the phone number of the mobile phone input into the text box 171*e*. When the selection operation to select the email is performed on the drop-down list 171*d*, an email in which the request for change of the piece of design information is described is transmitted to the email address input into the text box 17*e*.

A notification of the request for change of the piece of design information can thereby be received using a desired notification method at a desired notification destination.

1.6 Extraction of Piece of Design Information to be Changed

Figure 5:
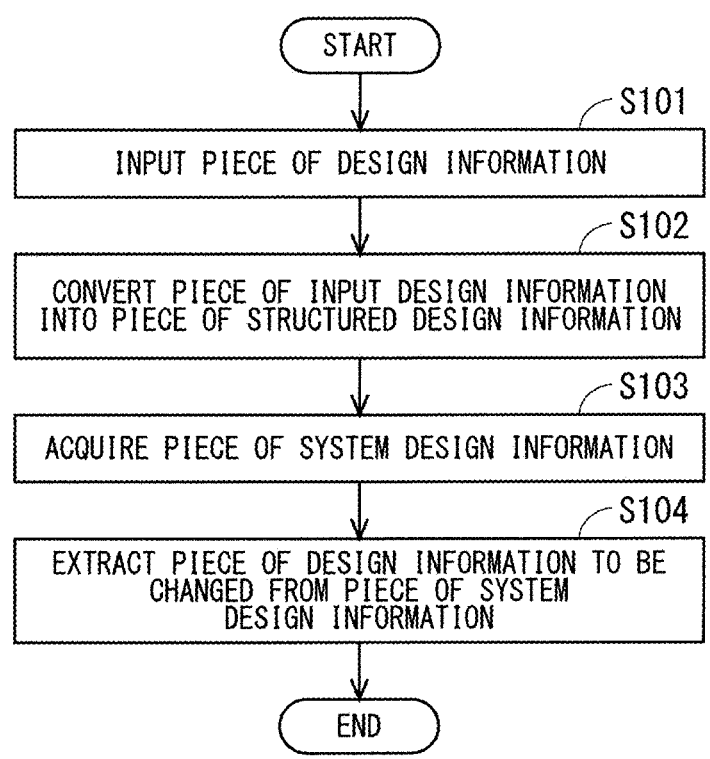
FIG. 5 is a flowchart showing procedures according to which the manufacturing system design assistance apparatus in Embodiment 1 extracts a piece of design information to be changed.

FIG. 5 is a flowchart showing procedures according to which the manufacturing system design assistance apparatus in Embodiment 1 extracts the piece of design information to be changed.

Steps S101 to S104 shown in FIG. 5 are performed when the piece of design information to be changed is extracted.

In step S101, while the manufacturing system design assistance apparatus 1 waits for input of a piece of design information from any design tool included in the plurality of design tools 2, the piece of design information is input into the design information input/output unit 11.

In subsequent step S102, the design information input/output unit 11 converts the piece of input design information into the piece of structured design information, and passes the piece of structured design information to the design result influence analysis unit 14.

In subsequent step S103, the design result influence analysis unit 14 asks the design information integrated management unit 13 to acquire the piece of system design information 121 from the design information storage unit 12.

In subsequent step S104, the design information integrated management unit 13 acquires the piece of system design information 121 from the design information storage unit 12, and extracts the piece of design information to be changed from the piece of acquired system design information 121.

1.7 Notification of Piece of Design Information to be Changed

Figure 6:
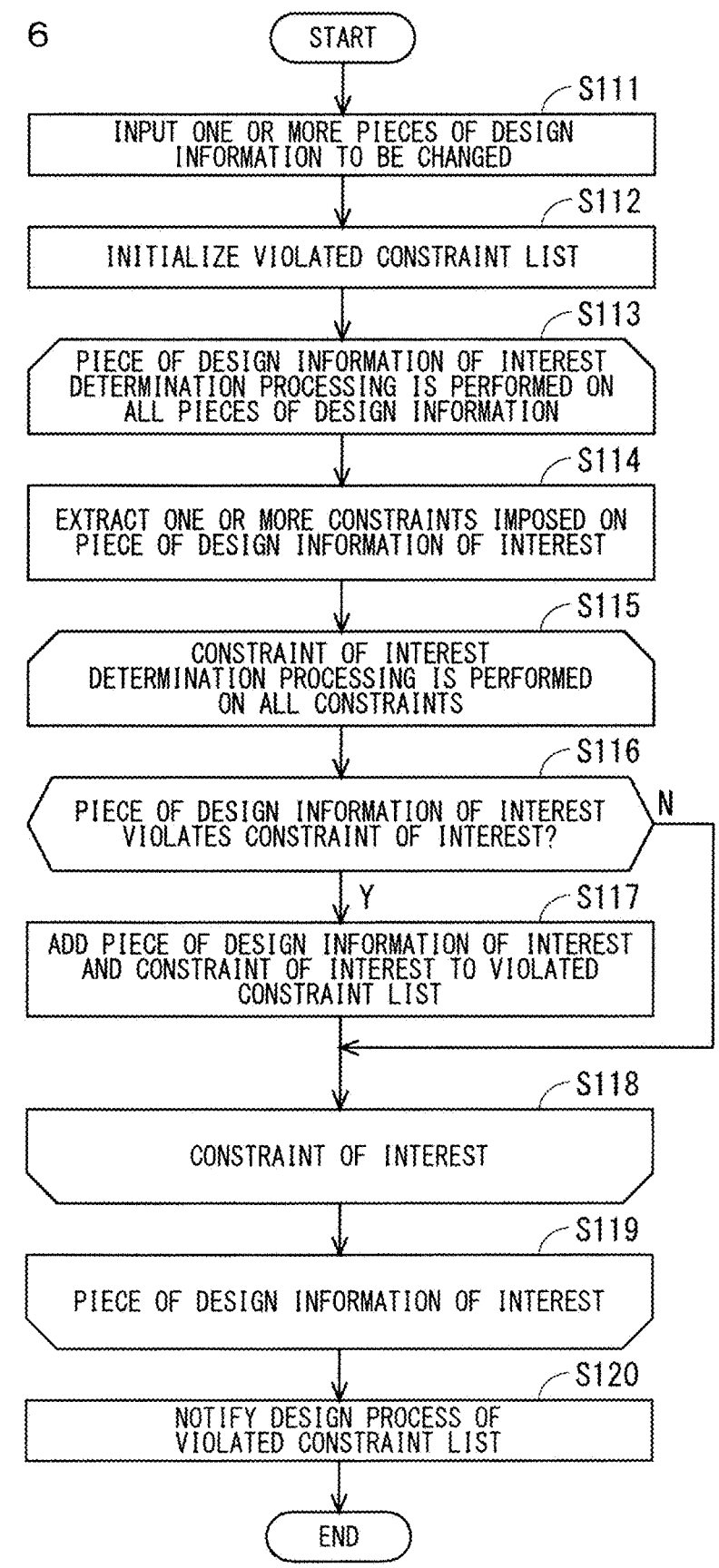
FIG. 6 is a flowchart showing procedures according to which the manufacturing system design assistance apparatus in Embodiment 1 notifies a design process of a request for change of the piece of design information.

FIG. 6 is a flowchart showing procedures according to which the manufacturing system design assistance apparatus in Embodiment 1 notifies the design process of the request for change of the piece of design information.

Steps S111 to S120 shown in FIG. 6 are performed when the design process is notified of the request for change of the piece of design information.

In step S111, one or more pieces of design information to be changed are input into the design result influence analysis unit 14.

In subsequent step S112, the design result influence analysis unit 14 initializes the violated constraint list.

In a determination processing loop in subsequent steps S113 to S119, the design result influence analysis unit 14 selects a piece of design information of interest from the one or more pieces of input design information to be changed, and performs determination processing on the piece of selected design information of interest. The design result influence analysis unit 14 repeats selection of the piece of design information of interest and determination processing on the piece of selected design information of interest while changing the piece of design information of interest until determination processing is performed on all the pieces of design information.

In step S114, the design result influence analysis unit 14 extracts, from the dependencies 122, one or more constraints imposed on the piece of design information of interest.

In a determination processing loop in subsequent steps S115 to S118, the design result influence analysis unit 14 selects a constraint of interest from the extracted constraints, and performs determination processing on the selected constraint of interest. The design result influence analysis unit 14 repeats selection of constraint of interest and determination processing on the selected constraint of interest while changing the constraint of interest until determination processing is performed on all the constraints.

In step S116, the design result influence analysis unit 14 determines whether the piece of design information of interest violates the constraint of interest. When it is determined that the piece of design information of interest violates the constraint of interest, step S117 is performed, and then step S118 is performed. When it is determined that the piece of design information of interest does not violate the constraint of interest, step S118 is performed without performing step S117.

In step S117, the design result influence analysis unit 14 adds the piece of design information of interest and the constraint of interest to the violated constraint list.

According to steps S111 to S119, addition of the piece of design information and the constraint violated by the piece of design information to the violated constraint list is completed to complete the violated constraint list.

In subsequent step S120, the design result influence analysis unit 14 requests that the change request notification unit 15 notify a design process in which the piece of input design information is created of the completed violated constraint list in accordance with a notification setting set for the design process.

1.8 Other Examples of Constraints

The constraints included in the dependencies 122 may each be represented by a combination of a function having a piece of design information as a variable and evaluating a possibility of use of any pieces of past design information and a threshold to be compared with a result of operation of the function. In a case where the constraint is represented by the combination, it is determined that the piece of design information violates the constraint when the result of operation of the function is the threshold or more, for example. A piece of design information having a low possibility of use of any pieces of past design information can thereby be modified in a design process.

The constraints included in the dependencies 122 may each be a constraint that minimum design information acceptable by at least one other design process has been input. Thus, when a design is completed in a first design process included in the plurality of design processes, and transition to a second design process is desired, it is possible to determine whether conditions for completion of the first design process and transition from the first design process to the second design process are satisfied.

2 Embodiment 2

2.1 Main Difference between Embodiment 1 and Embodiment 2

Embodiment 2 differs from Embodiment 1 mainly in the following respects. In the other respects, a configuration similar to that used in Embodiment 1 is used in Embodiment 2.

In Embodiment 2, the plurality of pieces of design information included in the piece of system design information 121 each include a design value.

The dependencies 122 include a plurality of conditional expressions corresponding to the respective pieces of design information included in the piece of system design information 121. The plurality of conditional expressions each include a function having the above-mentioned design value as a parameter and a threshold to be compared with a return value of the function.

The design result influence analysis unit 14 determines whether the piece of input design information is required to be changed based on whether a conditional expression corresponding to a piece of design information of interest is true or not when the above-mentioned design value is changed by the piece of input design information. When the conditional expression is true, the design result influence analysis unit 14 determines that the piece of input design information is not required to be changed. When the conditional expression is not true, the design result influence analysis unit 14 determines that the piece of input design information is required to be changed.

The design result influence analysis unit 14 also extracts, from the plurality of pieces of design information included in the piece of system design information 121, one or more pieces of design information on which the piece of input design information has the above-mentioned influence based on the dependencies 122, and analyzes the above-mentioned influence using the one or more pieces of extracted design information.

When the piece of input design information is combined with the plurality of pieces of design information included in the piece of system design information 121, the design result influence analysis unit 14 extracts, based on the plurality of pieces of design information included in the piece of system design information 121 and the dependencies 122, a next design process in which a piece of design information is created next from the plurality of design processes.

The change request notification unit 15 notifies the extracted next design process of the need to create the piece of design information.

Figure 7:
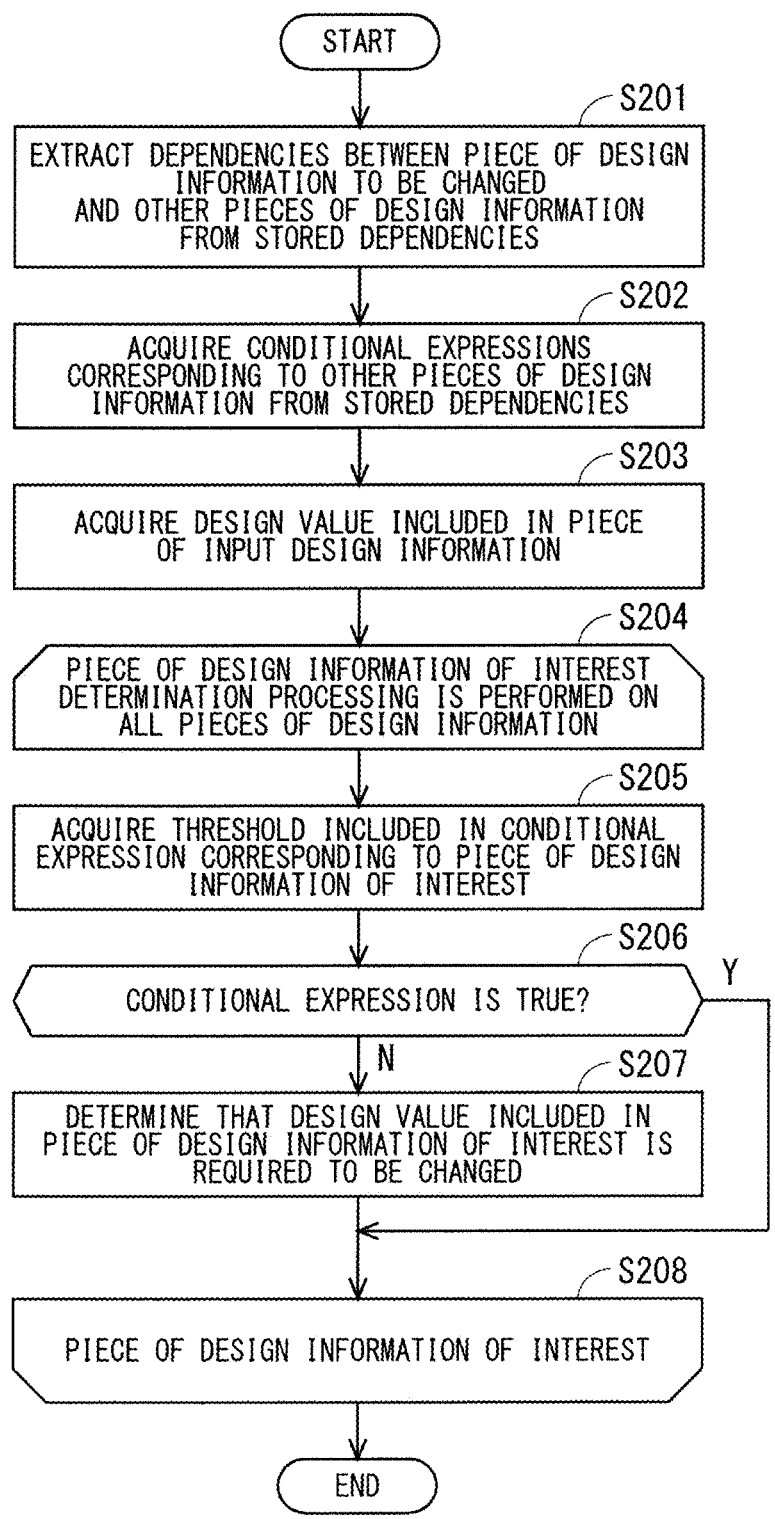
FIG. 7 is a flowchart showing procedures according to which a manufacturing system design assistance apparatus in Embodiment 2 extracts a piece of design information including a design value required to be changed by a piece of input design information.

2.2 Procedures for Extracting Piece of Design Information Including Design Value Required to Be Changed by Piece of Input Design Information FIG. 7 is a flowchart showing procedures according to which a manufacturing system design assistance apparatus in Embodiment 2 extracts a piece of design information including a design value required to be changed by the piece of input design information.

Steps S201 to S208 shown in FIG. 7 are performed when processing to extract the piece of design information including the design value required to be changed by the piece of input design information is performed.

In step S201, the design result influence analysis unit 14 extracts, from the dependencies 122, dependencies between the piece of design information to be changed and other pieces of design information having dependencies with the piece of design information to be changed.

In subsequent step S202, the design result influence analysis unit 14 acquires, from the dependencies 122, conditional expressions corresponding to the above-mentioned other pieces of design information.

In subsequent step S203, the design result influence analysis unit 14 acquires a design value included in the piece of input design information from the design information integrated management unit 13.

In a determination processing loop in subsequent steps S204 to S208, the design result influence analysis unit 14 selects a piece of design information of interest from the above-mentioned other pieces of design information, and performs determination processing on the piece of selected design information of interest. The design result influence analysis unit 14 repeats selection of the piece of design information of interest and determination processing on the piece of selected design information of interest while changing the piece of design information of interest until determination processing is performed on all the pieces of design information.

In subsequent step S205, the design result influence analysis unit 14 acquires a threshold included in a conditional expression corresponding to the piece of design information of interest.

In subsequent step S206, the design result influence analysis unit 14 uses the acquired design value as a parameter of a function included in the conditional expression corresponding to the piece of design information of interest, and determines whether the conditional expression is true or not. When it is determined that the conditional expression is not true, step S207 is performed, and then step S208 is performed. When it is determined that the conditional expression is true, step S208 is performed without performing step S207.

In step S207, the design result influence analysis unit 14 determines that the design value included in the piece of design information of interest is required to be changed.

According to steps S201 to S208, the piece of design information including the design value required to be changed by the piece of input design information can be extracted from the other pieces of design information having dependencies with the piece of design information to be changed. This allows for detection of a case where the design value included in the piece of input design information is required to be changed and a case where the design value included in any of the other pieces of design information is required to be changed.

2.3 Procedures for Extracting Next Design Process

Figure 8:
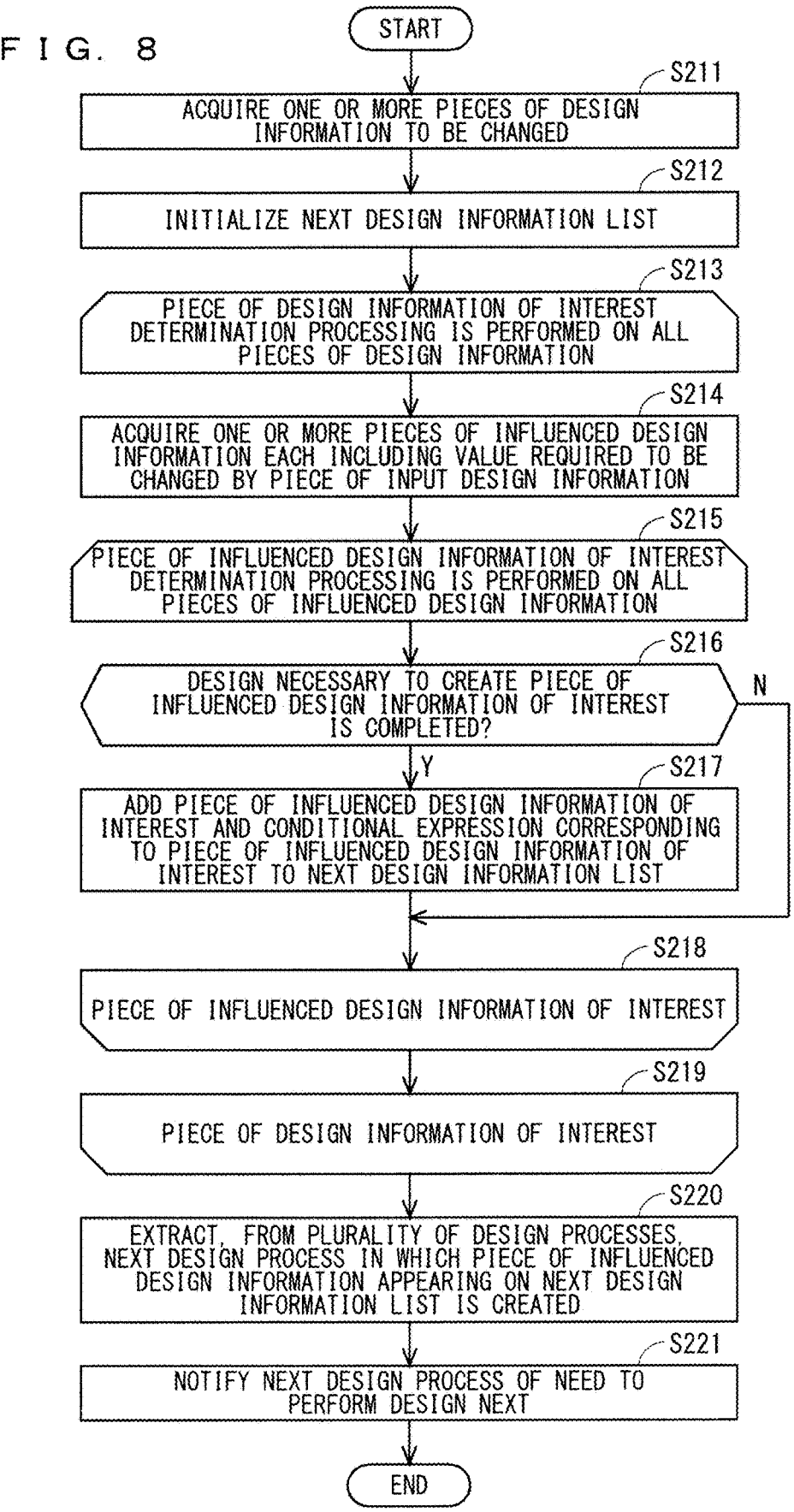
FIG. 8 is a flowchart showing procedures according to which the manufacturing system design assistance apparatus in Embodiment 2 extracts a next design process.

FIG. 8 is a flowchart showing procedures according to which the manufacturing system design assistance apparatus in Embodiment 2 extracts the next design process.

After the design process is notified of the empty violated constraint list, and the piece of input design information is combined with the plurality of pieces of design information included in the piece of system design information 121, the design result influence analysis unit 14 performs processing to extract the next design process. Steps S211 to S221 shown in FIG. 8 are performed when processing to extract the next design process is performed.

In step S211, the design result influence analysis unit 14 acquires the one or more pieces of design information to be changed. The one or more pieces of design information to be changed are acquired by performing procedures shown in FIG. 5.

In subsequent step S212, the design result influence analysis unit 14 initializes a next design information list on which a piece of next design information to be created next appears.

In a determination processing loop in subsequent steps S213 to S219, the design result influence analysis unit 14 selects a piece of design information of interest from the one or more pieces of acquired design information to be changed, and performs determination processing on the piece of selected design information of interest. The design result influence analysis unit 14 repeats selection of the piece of design information of interest and determination processing on the piece of selected design information of interest while changing the piece of design information of interest until determination processing is performed on all the pieces of design information.

In subsequent step S214, the design result influence analysis unit 14 acquires, based on the dependencies 122, one or more pieces of influenced design information on which the piece of input design information has the influence. The one or more pieces of influenced design information are acquired by performing procedures shown in FIG. 7.

In a determination processing loop in subsequent steps S215 to S218, the design result influence analysis unit 14 selects a piece of influenced design information of interest from the one or more pieces of acquired influenced design information, and performs determination processing on the piece of selected influenced design information of interest. The design result influence analysis unit 14 repeats selection of the piece of influenced design information of interest and determination processing on the piece of selected influenced design information of interest while changing the piece of influenced design information of interest until determination processing is performed on all the pieces of influenced design information.

In step S216, the design result influence analysis unit 14 determines whether a design necessary to create the piece of influenced design information of interest is completed. When it is determined that the necessary design is completed, step S217 is performed, and then step S218 is performed. When it is determined that the necessary design is not completed, step S218 is performed without performing step S217.

In step S217, the design result influence analysis unit 14 adds the piece of influenced design information of interest and a conditional expression corresponding to the piece of influenced design information of interest to the next design information list.

According to steps S211 to S219, addition of the piece of influenced design information for which the necessary design is completed and the conditional expression corresponding to the piece of influenced design information to the next design information list is completed to complete the next design information list.

In subsequent step S220, the design result influence analysis unit 14 requests that the design information integrated management unit 13 extract, from the plurality of design processes, the next design process in which the piece of influenced design information appearing on the next design information list is created.

In subsequent step S221, the design result influence analysis unit 14 requests that the change request notification unit 15 notify the extracted next design process of the need to create the piece of design information next.

According to steps S211 to S221, operation and transfer of any piece of necessary design information from the first design process to the second design process can be performed substantially automatically.

3 Embodiment 3

3.1 Main Difference between Embodiment 2 and Embodiment 3

Embodiment 3 differs from Embodiment 2 mainly in the following respects. In the other respects, a configuration similar to that used in Embodiment 2 is used in Embodiment 3.

Figure 9:
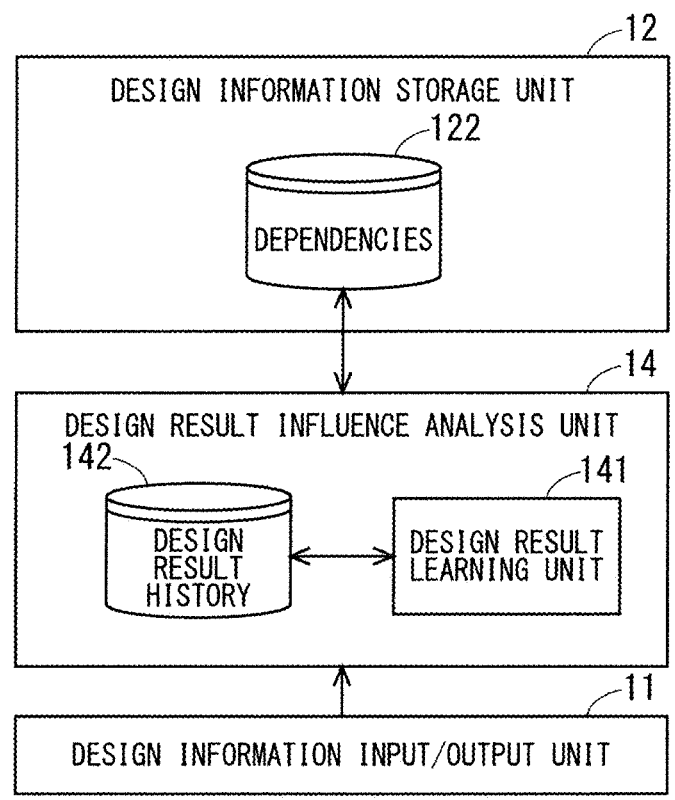
FIG. 9 is a block diagram schematically showing a portion of a manufacturing system design assistance apparatus in Embodiment 3.

FIG. 9 is a block diagram schematically showing a portion of a manufacturing system design assistance apparatus in Embodiment 3.

In Embodiment 3, the design result influence analysis unit 14 includes a design result learning unit 141, and stores a design result history 142 as shown in FIG. 9.

A piece of design information changed in the design process notified of the request for change of the piece of design information is input into the design information input/output unit 11.

The design result learning unit 141 determines whether the piece of changed design information is good or bad, and includes a result of determination in the design result history 142. Determination on whether the piece of changed design information is good or bad is made based on a result of evaluation from an evaluation standpoint when the piece of design information to be changed is changed. The evaluation standpoint includes at least one evaluation standpoint selected from the group consisting of productivity, expected quality, manufacturing costs, and an amount of power consumption of a manufacturing system.

The design result history 142 includes a history of a combination of pieces of data of the piece of changed design information, a threshold used when the piece of design information including the design value required to be changed is extracted, a result of extraction of the piece of design information appearing on the next design information list, and a result of determination on whether the piece of changed design information is good or bad.

The design result learning unit 141 also learns the result of determination on whether the piece of changed design information is good or bad based on the design result history 142. The result of determination is learned, for example, in accordance with a reinforcement learning algorithm having the piece of changed design information as a state, the result of extraction of the piece of design information appearing on the next design information list as an action, and the result of determination on whether the piece of changed design information is good or bad as a reward. The reinforcement learning algorithm is stored in the application program installed on the computer.

The design result learning unit 141 also updates the dependencies 122 based on a result of learning. The design result learning unit 141 updates the dependencies 122 by updating the threshold included in the dependencies 122 so that the result of extraction of the piece of design information appearing on the next design information list is optimized.

According to such updating of the dependencies 122, accuracy of analysis of the influence of the piece of input design information on the other pieces of design information is improved by repeating change of the piece of design information.

4 Embodiment 4

4.1 Main Difference between Embodiments 1-3 and Embodiment 4

Embodiment 4 differs from Embodiments 1-3 mainly in the following respects. In the other respects, a configuration similar to that used in Embodiments 1-3 is used in Embodiment 4.

Figure 10:
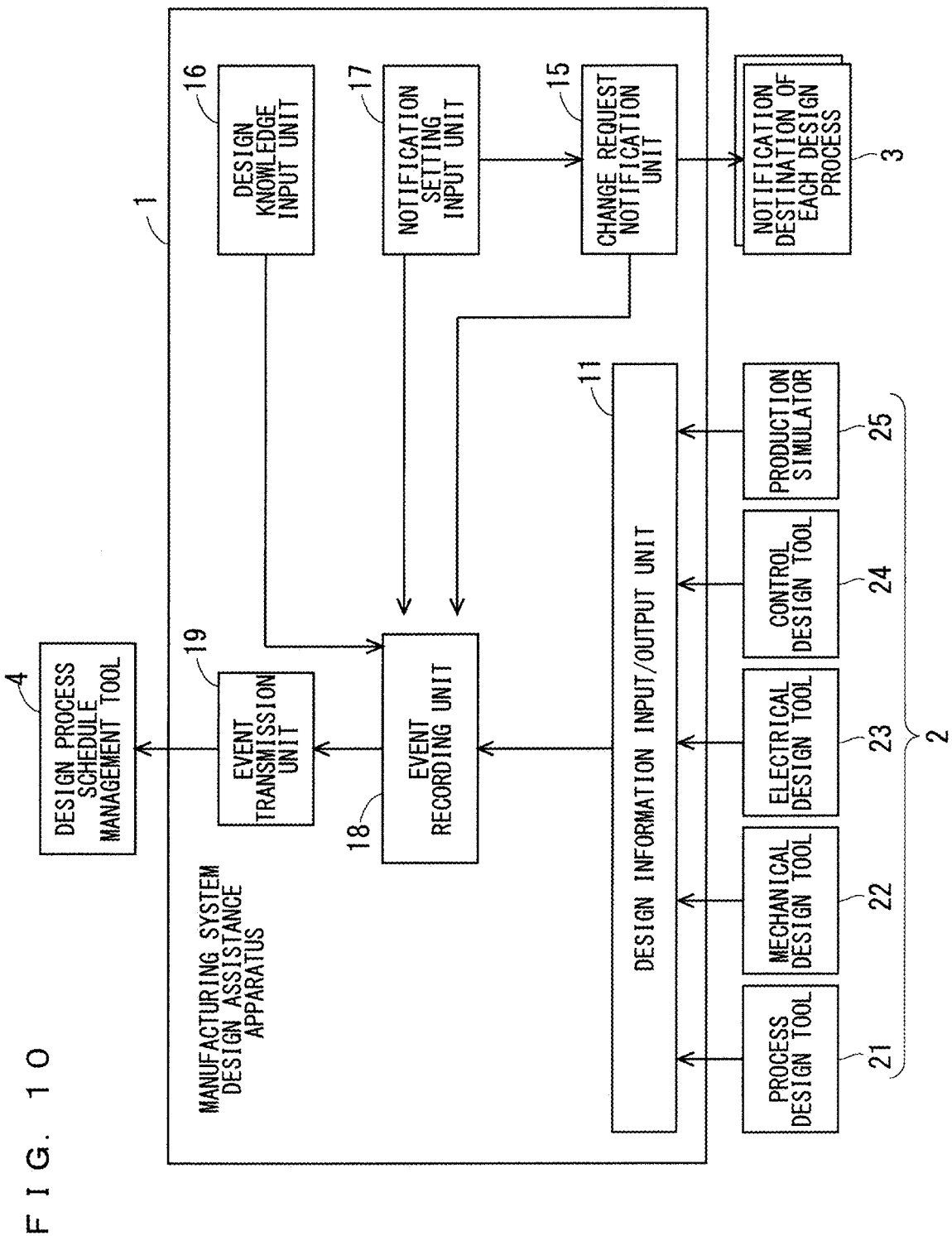
FIG. 10 is a block diagram schematically showing a portion of a manufacturing system design assistance apparatus in Embodiment 4.

FIG. 10 is a block diagram schematically showing a portion of a manufacturing system design assistance apparatus in Embodiment 4.

In Embodiment 4, the manufacturing system design assistance apparatus 1 includes an event recording unit 18 and an event transmission unit 19 as shown in FIG. 10.

The event recording unit 18 records at least one event selected from the group consisting of an event in which the piece of design information is input into the design information input/output unit 11, an event in which the change request notification unit 15 notifies the design process of the request for change, an event in which design knowledge is input into the design knowledge input unit 16, and an event in which the plurality of notification settings are input into the notification setting input unit 17 and a time of occurrence of the at least one event.

The event recording unit 18 is desired to record all the events. When the event recording unit 18 records all the events, events input into and output from the manufacturing system design assistance apparatus 1 are recorded on the event recording unit 18 in chronological order.

According to the event recording unit 18, a change of a state in design of the manufacturing system can be tracked in chronological order.

The event transmission unit 19 transmits the recorded events and times of occurrence thereof to an external design process schedule management tool 4. According to the event transmission unit 19, the progress of the design processes can automatically be reflected in a design process schedule.

Embodiments of the present invention can freely be combined with each other, and can be modified or omitted as appropriate within the scope of the invention.

While the invention has been described in detail, the foregoing description is in all aspects illustrative and not restrictive. It is therefore understood that numerous unillustrated modifications can be devised without departing from the scope of the invention.

EXPLANATION OF REFERENCE SIGNS

1 manufacturing system design assistance apparatus, 3 notification destination, 4 design process schedule management tool, 11 design information input/output unit, 12 design information storage unit, 13 design information integrated management unit, 14 design result influence analysis unit, 15 change request notification unit, 16 design knowledge input unit, 17 notification setting input unit, 18 event recording unit, 19 event transmission unit, 121 piece of system design information, 122 dependencies.

The invention claimed is:

1. A manufacturing system design assistance apparatus comprising:
    design information input circuitry into which a piece of design information created in a plurality of design processes responsible for designing a manufacturing system is input;
    a design information storage to store a plurality of pieces of design information created in the plurality of design processes and dependencies among the plurality of pieces of design information;
    design information integrated management circuitry to extract, from the plurality of pieces of design information, a piece of design information to be changed by the piece of design information, and combine the piece of design information that is input with the plurality of pieces of design information;
    a design result influence analyzer to analyze, based on the dependencies, a constraint or a conditional expression on the piece of design information on one or more pieces of design information other than the piece of design information to be changed included in the plurality of pieces of design information, and determine whether the piece of design information is required to be changed; and
    change request notification circuitry to notify the design process of a request for change of the piece of design information when it is determined that the piece of design information is required to be changed.

2. The manufacturing system design assistance apparatus according to claim 1, wherein
    the plurality of design processes comprise at least one design process selected from a group consisting of a process design, a mechanical design, an electrical design, a control design, and design verification.

3. The manufacturing system design assistance apparatus according to claim 1, wherein
    the design information integrated management circuitry combines the piece of design information with the plurality of pieces of design information when it is determined that the piece of design information is not required to be changed.

4. The manufacturing system design assistance apparatus according to claim 1, wherein
    the design information storage stores a piece of system design information including the plurality of pieces of design information and having a particular data structure in which the plurality of pieces of design information are structured,
    the design information input circuitry converts the piece of design information into a piece of structured design information having the particular data structure, and
    the design information integrated management unit extracts the piece of design information to be changed based on the piece of system design information and the piece of structured design information.

5. The manufacturing system design assistance apparatus according to claim 1, further comprising
    design knowledge input circuitry into which design knowledge relating to the dependencies is input.

6. The manufacturing system design assistance apparatus according to claim 1, further comprising
    notification setting input circuitry into which a plurality of notification settings set for the respective design processes are input, wherein the change request notification circuitry notifies the design process of the request in accordance with a notification setting set for the design process.

7. The manufacturing system design assistance apparatus according to claim 1, wherein
the plurality of pieces of design information each include a design value,
the dependencies include a plurality of conditional expressions corresponding to the respective pieces of design information,
the plurality of conditional expressions each include a function having the design value as a parameter and a threshold to be compared with a return value of the function, and
the design result influence analyzer determines whether the piece of design information is required to be changed based on whether a conditional expression corresponding to a piece of design information of interest is true or not when the design value is changed by the piece of design information.

8. The manufacturing system design assistance apparatus according to claim 1, wherein
the design result influence analyzer extracts, from the plurality of pieces of design information, the one or more pieces of design information on which the piece of design information has the constraint or the conditional expression based on the dependencies, and analyzes the constraint or the conditional expression using the one or more pieces of extracted design information.

9. The manufacturing system design assistance apparatus according to claim 1, wherein
when the piece of design information is combined with the plurality of pieces of design information, the design result influence analyzer extracts, based on the plurality of pieces of design information and the dependencies, a next design process in which a piece of design information is created next from the plurality of design processes, and the change request notification circuitry notifies the next design process of a need to create the piece of design information.

10. The manufacturing system design assistance apparatus according to claim 1, wherein
a piece of changed design information is input into the design information input circuitry, and
the design result influence analyzer determines whether the piece of changed design information is acceptable, learns a result of the determination, and updates the dependencies based on a result of learning.

11. The manufacturing system design assistance apparatus according to claim 1, further comprising:
design knowledge input circuitry into which design knowledge relating to the dependencies is input;
notification setting input circuitry into which a plurality of notification settings set for the respective design processes are input; and
an event recorder to record at least one event selected from the group consisting of an event in which the piece of design information is input into the design information input circuitry, an event in which the change request notification circuitry notifies the design process of the request, an event in which the design knowledge is input into the design knowledge input circuitry, and an event in which the plurality of notification settings are input into the notification setting input circuitry and a time of occurrence of the at least one event.

12. The manufacturing system design assistance apparatus according to claim 11, further comprising
an event transmitter to transmit the at least one event and the time of occurrence to an external design process schedule management tool.

13. The manufacturing system design assistance apparatus according to claim 1, wherein
the constraint is a constraint imposed on the piece of design information.

* * * * *